(12) United States Patent
Sen et al.

(10) Patent No.: US 10,477,202 B2
(45) Date of Patent: Nov. 12, 2019

(54) METHOD AND APPARATUS FOR ENCODING AND DECODING HAPTIC INFORMATION IN MULTI-MEDIA FILES

(71) Applicant: IMMERSION CORPORATION, San Jose, CA (US)

(72) Inventors: Arnab Sen, San Jose, CA (US); Christopher J. Ullrich, Ventura, CA (US); Juan Manuel Cruz-Hernandez, Montreal (CA); Ali Modarres, Mont-Royal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/972,565

(22) Filed: May 7, 2018

(65) Prior Publication Data
US 2018/0255294 A1    Sep. 6, 2018

Related U.S. Application Data

(63) Continuation of application No. 13/842,912, filed on Mar. 15, 2013, now Pat. No. 9,992,491.

(51) Int. Cl.
*H04N 19/10* (2014.01)
*H04N 9/806* (2006.01)
(Continued)

(52) U.S. Cl.
CPC ............. *H04N 19/10* (2014.11); *G06F 3/165* (2013.01); *G11B 31/00* (2013.01); *H04N 9/806* (2013.01);
(Continued)

(58) Field of Classification Search
CPC .......... H04N 19/10; H04N 9/806; H04N 9/87; H04N 21/4126; G06F 3/165; G11B 31/00
See application file for complete search history.

(56) References Cited

U.S. PATENT DOCUMENTS

| 7,208,671 | B2 | 4/2007 | Chu |
| 2002/0033795 | A1 | 3/2002 | Shahoian et al. |

(Continued)

FOREIGN PATENT DOCUMENTS

| JP | 2009-532808 A | 9/2009 |
| JP | 2011-040067 A | 2/2011 |
| WO | 2012/090031 A1 | 7/2012 |

OTHER PUBLICATIONS

Office Action issued in Chinese Patent Application No. 201410096022.2, dated Aug. 1, 2018.

(Continued)

*Primary Examiner* — Mishawn N. Hunter
(74) *Attorney, Agent, or Firm* — Medler Ferro Woodhouse & Mills PLLC (57) ABSTRACT

A method for encoding haptic information inside a multi-media file having content includes changing a portion of the content in the multi-media file, and adding the haptic information to the changed portion of the content, the haptic information corresponding to a haptic signal for generating a haptic effect upon playback of the multi-media file. A method for decoding haptic information from inside a multi-media file having content includes locating the haptic information inside the multi-media file, and generating a haptic signal based on the located haptic information during playback of the content of the multi-media file. A method includes receiving a multi-media signal comprising an audio signal and a haptic signal with a receiver of a haptic device, and outputting a haptic effect with a haptic output device of the haptic device based on the haptic signal in the multi-media signal.

20 Claims, 10 Drawing Sheets

(51) Int. Cl.

| | | |
|---|---|---|
| *G06F 3/16* | (2006.01) | |
| *H04N 21/43* | (2011.01) | |
| *H04N 21/41* | (2011.01) | |
| *H04N 21/422* | (2011.01) | |
| *H04N 21/439* | (2011.01) | |
| *H04N 21/854* | (2011.01) | |
| *G11B 31/00* | (2006.01) | |
| *H04N 9/87* | (2006.01) | |

(52) U.S. Cl.
CPC .......... *H04N 9/87* (2013.01); *H04N 21/4126* (2013.01); *H04N 21/42203* (2013.01); *H04N 21/43* (2013.01); *H04N 21/4394* (2013.01); *H04N 21/85406* (2013.01)

(56) References Cited

U.S. PATENT DOCUMENTS

| | | |
|---|---|---|
| 2003/0086167 A1 | 5/2003 | Sonehara |
| 2006/0017691 A1 | 1/2006 | Cruz-Hernandez et al. |
| 2006/0087941 A1 | 4/2006 | Obradovich |
| 2007/0236449 A1 | 10/2007 | Lacroix et al. |
| 2008/0223627 A1 | 9/2008 | Lacroix et al. |
| 2009/0079690 A1 | 3/2009 | Watson et al. |
| 2009/0096632 A1 | 4/2009 | Ullrich et al. |
| 2009/0128306 A1 | 5/2009 | Luden et al. |
| 2011/0102326 A1 | 5/2011 | Casparian et al. |
| 2011/0280551 A1 | 11/2011 | Sammon |
| 2012/0021389 A1 | 1/2012 | Wakamoto |
| 2012/0028577 A1 | 2/2012 | Rodriguez et al. |
| 2012/0062491 A1 | 3/2012 | Coni et al. |
| 2012/0306631 A1 | 12/2012 | Hughes |
| 2014/0267911 A1* | 9/2014 | Grant ............... H04N 21/42222 348/563 |

OTHER PUBLICATIONS

Decision of Refusal issued in Japanese Patent Application No. 2014-046370, dated Jun. 15, 2018.
Communication issued in issued in European Patent Application No. 14159952.2, dated Jun. 27, 2018.
Extended European Search Report and Search Opinion issued in European Patent Application No. 14159952.2, dated Jun. 30, 2014.
Notification of the Fourth Office Action issued in Chinese Application No. 201410096022.2 dated Apr. 18, 2019.
Notification of the Third Office Action issued in Chinese Application No. 201410096022.2, dated Jan. 3, 2019.

* cited by examiner

METHOD AND APPARATUS FOR ENCODING AND DECODING HAPTIC INFORMATION IN MULTI-MEDIA FILES

CROSS-REFERENCE TO RELATED APPLICATIONS

This application is a continuation of prior U.S. application Ser. No. 13/842,912 filed on Mar. 15, 2013, which is hereby incorporated by reference in its entirety for all purposes.

FIELD

The present invention is related to methods and apparatus for encoding haptic information in multi-media files, such as audio and/or video files, and methods and apparatus for decoding haptic information in multi-media files.

BACKGROUND

It is commonly accepted that adding tactile feedback to media objects such as images, movies or audio clips can, in some cases, enhance the user experience of the media object. For example a photo of a cat may have a purring tactile sensation associated with it. A key challenge in associating tactile feedback with media objects is that most rendering engines do not make provisions for explicit haptic effect information. It is possible to have a separate file or stream with this information, but this secondary content source complicates existing content delivery mechanisms such as Hypertext Transfer Protocol ("HTTP").

One potential solution to this challenge is to automatically generate haptic content from the media object at the rendering endpoint. Existing algorithms and methods may do this type of content creation by using audio and movie media objects as input. Other algorithms and methods may extract spatial texture information from images and render this locally. Both of these approaches are suitable only for mechanically obvious haptic displays. Novel content as intended by the content producer cannot be generated with this approach.

SUMMARY

It is desirable to add more realism and life to a multi-media object. In accordance with aspects of the present invention, a watermarking or steganography algorithm or method may be used to encode digital information directly into the media content itself.

According to an aspect of the present invention, there is provided a method for encoding haptic information inside a multi-media file having content. The method includes changing a portion of the content in the multi-media file, and adding the haptic information in the changed portion of the content, the haptic information corresponding to a haptic signal for generating a haptic effect upon playback of the multi-media file.

According to an aspect of the present invention, there is provided a method for decoding haptic information from inside a multi-media file having content. The method includes locating the haptic information inside the multi-media file, and generating a haptic signal based on the located haptic information during playback of the content of the multi-media file.

According to an aspect of the present invention, there is provided a haptic device that includes a media output device configured to output media content in a media file, a processor configured to open the media file, decode haptic information encoded in the media file, and output a haptic signal based on the haptic information decoded from the media file, and a haptic output device configured to output a haptic effect based on the haptic signal received from the processor.

According to an aspect of the present invention, there is provided a method that includes receiving a multi-media signal comprising an audio signal and a haptic signal with a receiver of a haptic device, and outputting a haptic effect with a haptic output device of the haptic device based on the haptic signal in the multi-media signal.

According to an aspect of the present invention, there is provided a haptic device that includes a receiver configured to receive a multi-media signal; a processor configured to process the multi-media signal and identify a haptic signal within the multi-media signal; and a haptic output device configured to output a haptic effect based on the haptic signal.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
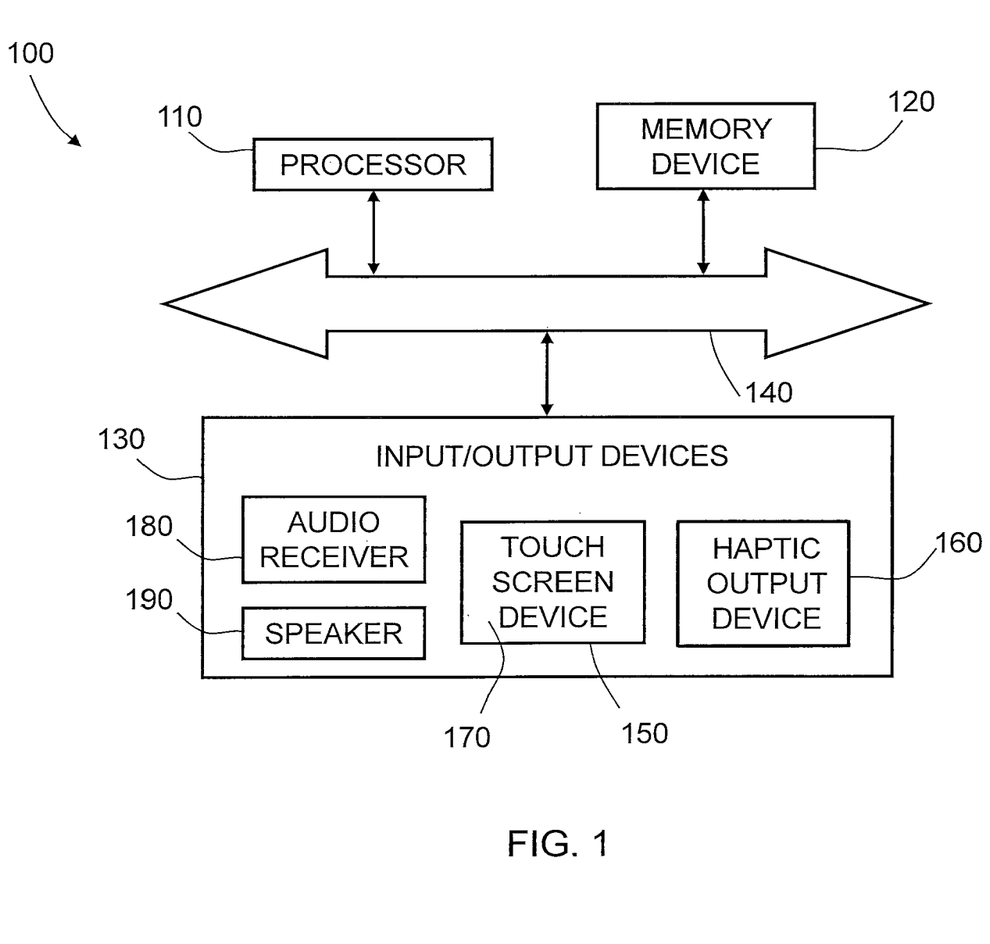
FIG. 1 is a schematic illustration of an electronic device according to embodiments of the invention.

FIG. 1 is a schematic illustration of an electronic device 100 in accordance with an embodiment of the invention. As illustrated, the electronic device 100 includes a processor 110, a memory device 120, and input/output devices 130, which are interconnected via a bus 140. In an embodiment, the input/output devices 130 may include a touch screen device 150 or other human-computer interface devices.

The touch screen device 150 may be configured as any suitable human-computer interface or touch/contact surface assembly. The touch screen device 150 may be any touch screen, touch pad, touch sensitive structure, computer monitor, laptop display device, workbook display device, kiosk screen, portable electronic device screen, or other suitable touch sensitive device. The touch screen device 150 may be configured for physical interaction with a user-controlled device, such as a stylus, finger, etc. In some embodiments, the touch screen device 150 may include at least one output device and at least one input device. For example, the touch screen device 150 may include a visual display and a touch sensitive screen superimposed thereon to receive inputs from a user's finger. The visual display may include a high definition display screen.

In various embodiments, a haptic output device 160 is configured to provide haptic feedback to at least a portion of the electronic device 100, which can be conveyed to a user in contact with the electronic device 100. Particularly, the haptic output device 160 may provide haptic feedback to the touch screen itself to impose a haptic effect when the user is in contact with the screen. As discussed in further detail below, the haptic effects may be used to enhance the user experience when viewing content in media files.

The haptic effects can be created with any of the methods of creating haptics, such as vibration, deformation, kinesthetic sensations, electrostatic or ultrasonic friction, etc. In an embodiment, the haptic output device 160 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as a haptic (e.g., vibrotactile) feedback. The haptic output device 160 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In an embodiment, multiple haptic output devices may be used to generate different haptic effects.

The electronic device 100 may be any device, such as a desktop computer, laptop computer, electronic workbook, electronic handheld device (such as a mobile phone, smart phone, gaming device, personal digital assistant ("PDA"), portable e-mail device, portable Internet access device, calculator, etc.), kiosk (such as an automated teller machine, ticking purchasing machine, etc.), printer, point-of-sale device, game controller, wearable device, or other electronic device.

The processor 110 may be a general-purpose or specific-purpose processor or microcontroller for managing or controlling the operations and functions of the electronic device 100. For example, the processor 110 may be specifically designed as an application-specific integrated circuit ("ASIC") to control output signals to a driver of the input/output devices 130 to provide haptic effects. The processor 110 may be configured to decide, based on predefined factors, what haptic effects are to be generated based on a haptic signal received or determined by the processor 110, the order in which the haptic effects are generated, and the magnitude, frequency, duration, and/or other parameters of the haptic effects. The processor 110 may also be configured to provide streaming commands that can be used to drive the haptic output device 160 for providing a particular haptic effect. In some embodiments, the processing device 110 may actually include a plurality of processors, each configured to perform certain functions within the electronic device 100. The processor 110 is described in further detail below.

The memory device 120 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage devices may include haptic effect profiles, instructions for how the haptic output device 160 of the input/output devices 130 are to be driven, or other information for generating haptic effects.

In addition to the touch screen device 150, the input/output devices 130 may also include specific input mechanisms and output mechanisms. For example, the input mechanisms may include such devices as keyboards, keypads, cursor control devices (e.g., computer mice), other data entry devices, or an audio receiver 180, such as a microphone. Output mechanisms may include a computer monitor, virtual reality display device, audio output device, such as a speaker 190, printer, or other peripheral devices. The input/output devices 130 may include mechanisms that are designed to not only receive input from a user, but also provide feedback to the user, such as many examples of touch screen devices. The input/out devices 130 may include any suitable combination and configuration of buttons, keypads, cursor control devices, touch screen components, stylus-receptive components, or other data entry components.

In an embodiment, the touch screen device 150 includes a display surface 170, which may be rigid and configured to modulate its friction properties through, including but not limited to, electrostatic friction and ultra-sonic surface vibration, generated by a haptic output device 160, to give the user a feeling of surface relief (e.g., hills and valleys) when running a finger or stylus across the display that corresponds to the display image.

Figure 2:
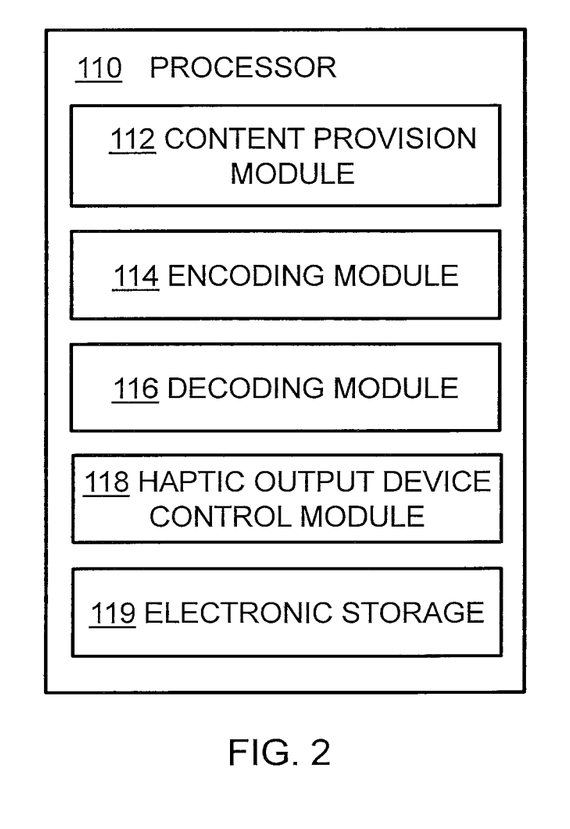
FIG. 2 is a schematic illustration of a processor of the electronic device of FIG. 1.

FIG. 2 illustrates an embodiment of the processor 110 in more detail. The processor 110 may be configured to execute one or more computer program modules. The one or more computer program modules may include one or more of a content provision module 112, an encoding module 114, a decoding module 116, a haptic output device control module 118, and/or other modules. The processor 110 may be configured to execute the modules 112, 114, 116, and/or 118 by software, hardware, firmware, some combination of software, hardware, and/or firmware, and/or other mechanisms for configuring processing capabilities on processor 110.

It should be appreciated that although modules 112, 114, 116, and 118 are illustrated in FIG. 2 as being co-located within a single processing unit, in embodiments in which the processor 110 includes multiple processing units, one or more of modules 112, 114, 116, and/or 118 may be located remotely from the other modules. The description of the functionality provided by the different modules 112, 114, 116, and/or 118 described below is for illustrative purposes, and is not intended to be limiting, as any of the modules 112, 114, 116, and/or 118 may provide more or less functionality than is described. For example, one or more of the modules 112, 114, 116, and/or 118 may be eliminated, and some or all of its functionality may be provided by other ones of the modules 112, 114, 116, and/or 118. As another example, the processor 110 may be configured to execute one or more additional modules that may perform some or all of the functionality attributed below to one of the modules 112, 114, 116, and/or 118.

The content provision module 112 is configured to control the provision of content to the user of the electronic device 100 via the touch screen device 150. If the content includes a media file that includes computer generated images (e.g., in a videogame, virtual world, augmented reality virtual world, simulation, etc.), the content provision module 112 is configured to generate the images and/or views for display to the user through the touch screen device 150. If the content includes a media file that includes video and/or still images or pictures, the content provision module 112 is configured to access the video and/or still images or pictures and to generate views of the video and/or still images or pictures for display on the touch screen device 150. If the content includes a media file that includes audio content, the content provision module 112 is configured to generate the electronic signals that will drive the speaker 190, to output corresponding sounds. The content, or media files from which the content is derived, may be obtained by the content provision module 112 from an electronic storage 119, which may be part of the processor 110, as illustrated in FIG. 2, or may be part of the memory device 120.

The encoding module 114 is configured to encode a haptic signal in a media file that may be stored in the electronic storage 119 and later accessed by the content provision module 112. For example, a watermarking or steganography algorithm or method may be used to encode digital information directly into the media content itself. Steganography is commonly used to provide digital rights management (DRM) by encoding copyright or other non-removable and imperceptible digital signature information directly into the media content. Algorithms for digital steganography are known for images, audio, and movie content formats.

The algorithms programmed into the encoding module 114 may be used by content producers to encode authored, explicit haptic information into the content itself. Examples of such haptic information include one or more haptic effects, a combination of haptic effects and rendering hints, e.g. a first haptic effect may be associated with darker pixels in an image and a second haptic effect that is different from the first haptic effect may be associated with lighter pixels in the image, and an algorithm that associates haptics with the content and/or with user interaction with the content. Methods for encoding haptic information in a media file are described in further detail below.

The decoding module 116 is configured to recognize when there is haptic information in the content and to decode the media file so that the haptic information that has been encoded in the media file may be played back with the haptic output device 160. Methods for decoding the haptic information from inside the media file are described in further detail below.

The haptic output device control module 118 is configured to determine the haptic effect to be generated by the haptic output device 160, based on the haptic information decoded from inside of the media file by the decoding module 116, and to control the haptic output device 160 to generate the determined haptic effect. Determining the haptic effect may include determining one or more parameters that include an amplitude, frequency, duration, etc., of the haptic effect that will enhance one or more aspects of the experience provided by the content to the user.

The haptic effect may be determined to enhance one or more of the realism of the content, the enjoyability of content, perception of the content by the user, and/or other aspects of the experience provided by the content being conveyed to the user via the touch screen 150 and/or the speaker 190. For example, a cat image that is displayed on the touch screen 150 may play a purring sensation when the image is first rendered, the cat image may play a purring sensation when the user selects the image, and/or the cat image may have a fur texture encoded therein and the user of the electronic device 100 may experience the texture of the fur by dragging a finger or stylus over the image displayed on the touch screen 150.

Figure 3:
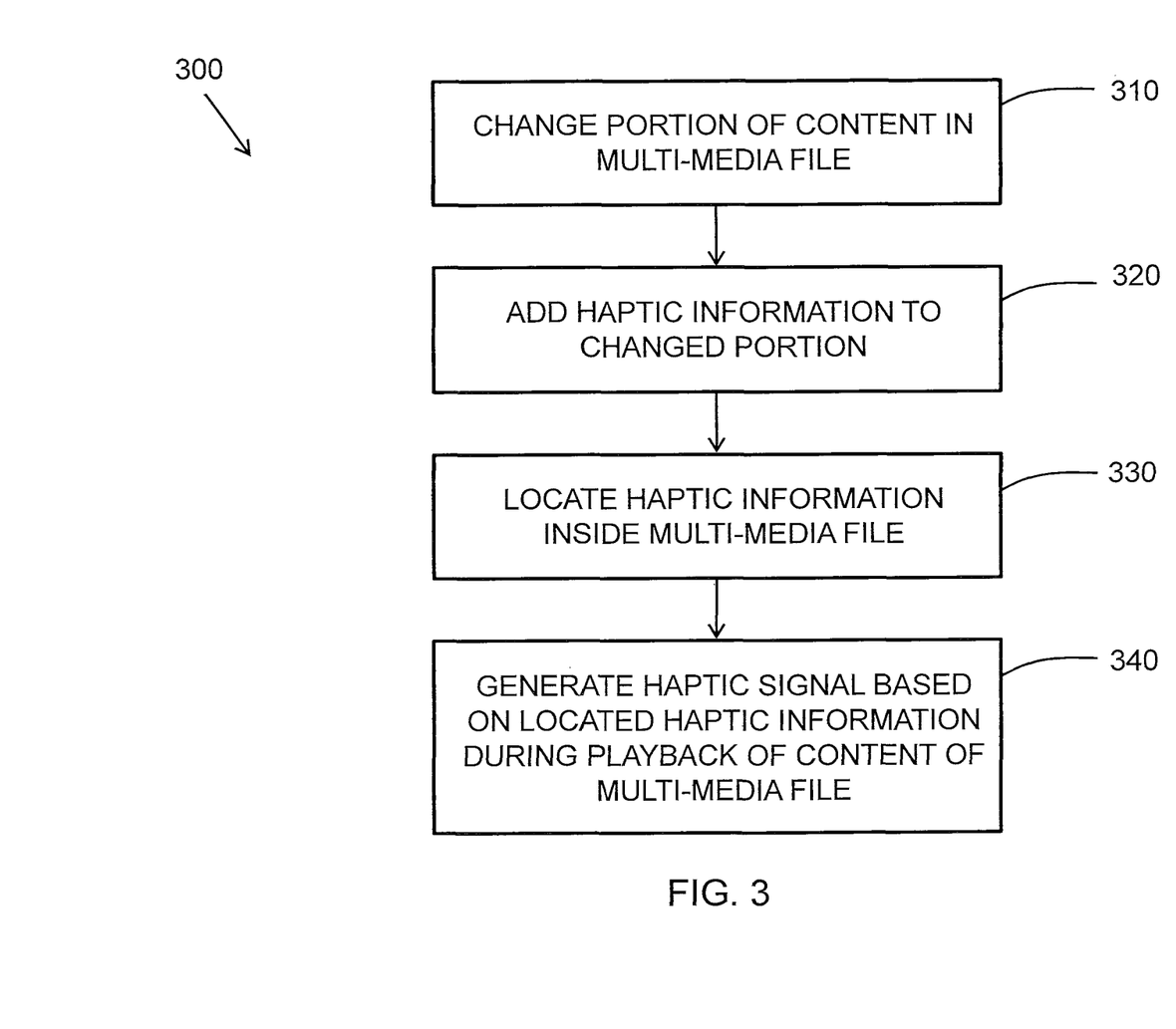
FIG. 3 is a flow diagram illustrating an embodiment of a method for generating haptic content and including the haptic content in the media file and playing the haptic content back with, the content of a media file.

FIG. 3 illustrates an embodiment of a method for generating haptic content and including the haptic content in the media file and playing the haptic content back with the content of a media file. More specifically, FIG. 3 illustrates an embodiment of a method 300 for encoding haptic information inside a multi-media file having content and for decoding the haptic information from inside a multi-media file having content. As part of the encoding of haptic information, at 310, at least a portion of the content of the multi-media file is changed. The content of the multi-media file may include an image, a video, and/or audio content. In an embodiment, a portion of the content of the multi-media file is removed. In an embodiment, a portion of the content of the multi-media file is rearranged. At 320, haptic information is added to the multi-media file in the changed portion of the content. The haptic information corresponds to a haptic signal for generating a haptic effect upon playback of the multi-media file. In an embodiment in which a portion of the content of the multi-media file was removed, the haptic information is added in place of the removed portion of the content. In an embodiment in which a portion of the content of the multi-media file is rearranged, the haptic information is added to the rearranged portion. As part of the decoding of the haptic information, at 330, the haptic information is located inside the multi-media file, and the haptic signal based on the located haptic information is generated during playback of the content of the multi-media file at 340.

Figure 4:
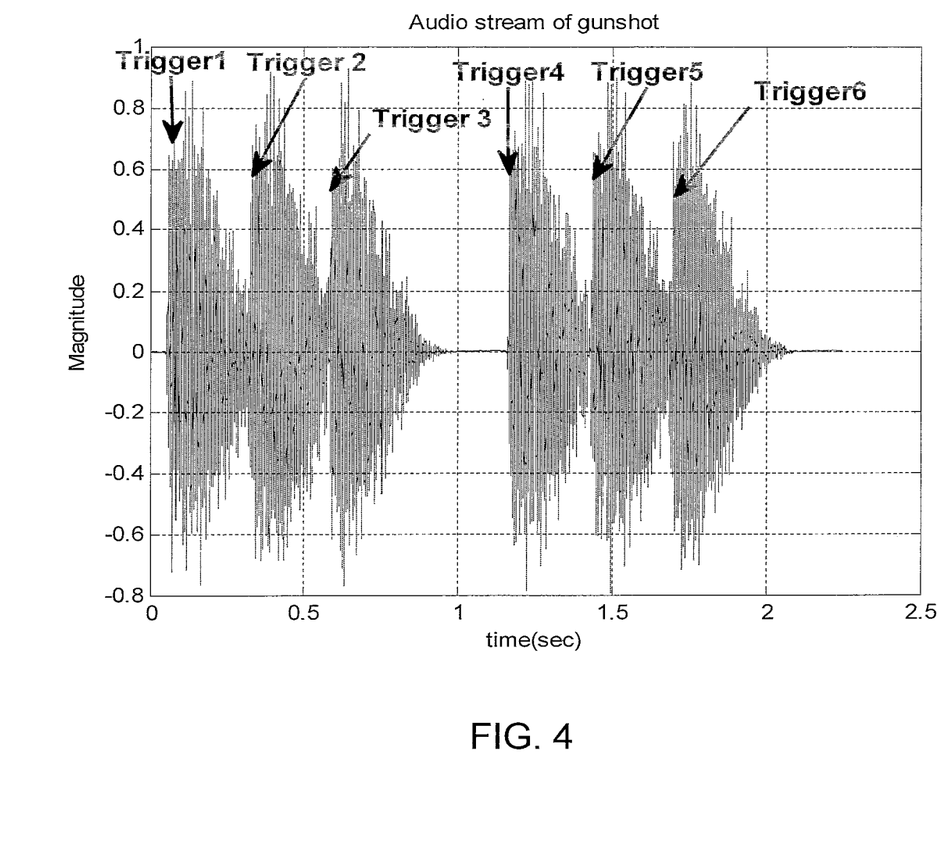
FIG. 4 illustrates an embodiment of an audio stream in a multi-media file that includes gunshot and six possible locations for the haptic trigger marks to be encoded in the gunshot audio file.

In an embodiment, triggers for the haptic effects to be generated during playback may be encoded in the multi-media file, such as an audio file. By encoding a trigger mark corresponding to the playback of a predetermined haptic effect in the audio file, when a trigger mark is played during playback of the audio file, a haptic signal may be sent to the haptic output device so that a haptic effect will be generated at the desired time. In an embodiment, the trigger mark may be in the form of a relatively high frequency signal, such as at the Nyquist frequency, having a few oscillations for less than a millisecond. Such a trigger mark in a complex audio stream should not be noticed and therefore is a good location to encode the trigger mark to indicate where haptic effects should be played during playback of the multi-media file. FIG. 4 illustrates an embodiment of an audio stream in a multi-media file that includes gunshot and six possible locations for the haptic trigger marks to be encoded in the gunshot audio file.

Figure 5:
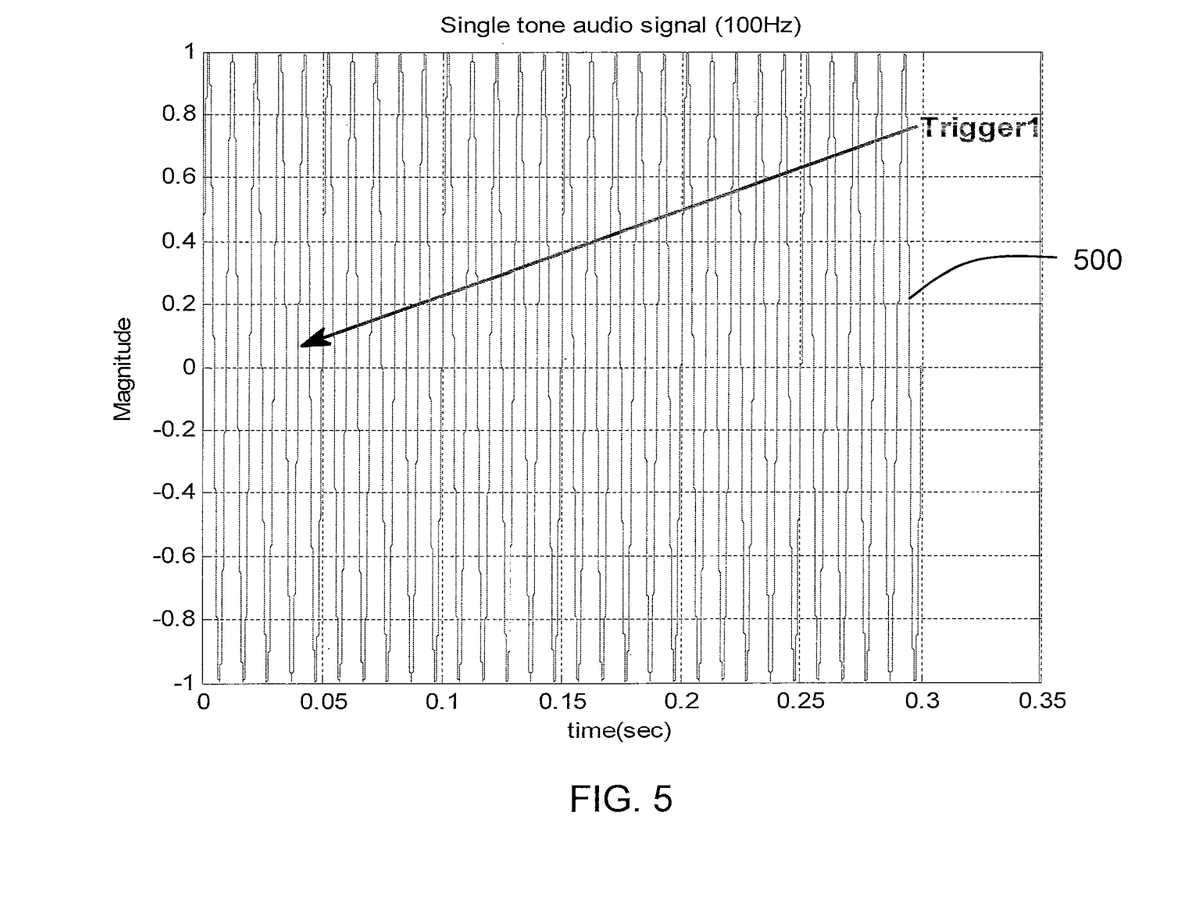
FIG. 5 illustrates an embodiment of a single tone audio signal to which a haptic effect trigger mark will be added.
Figure 6:
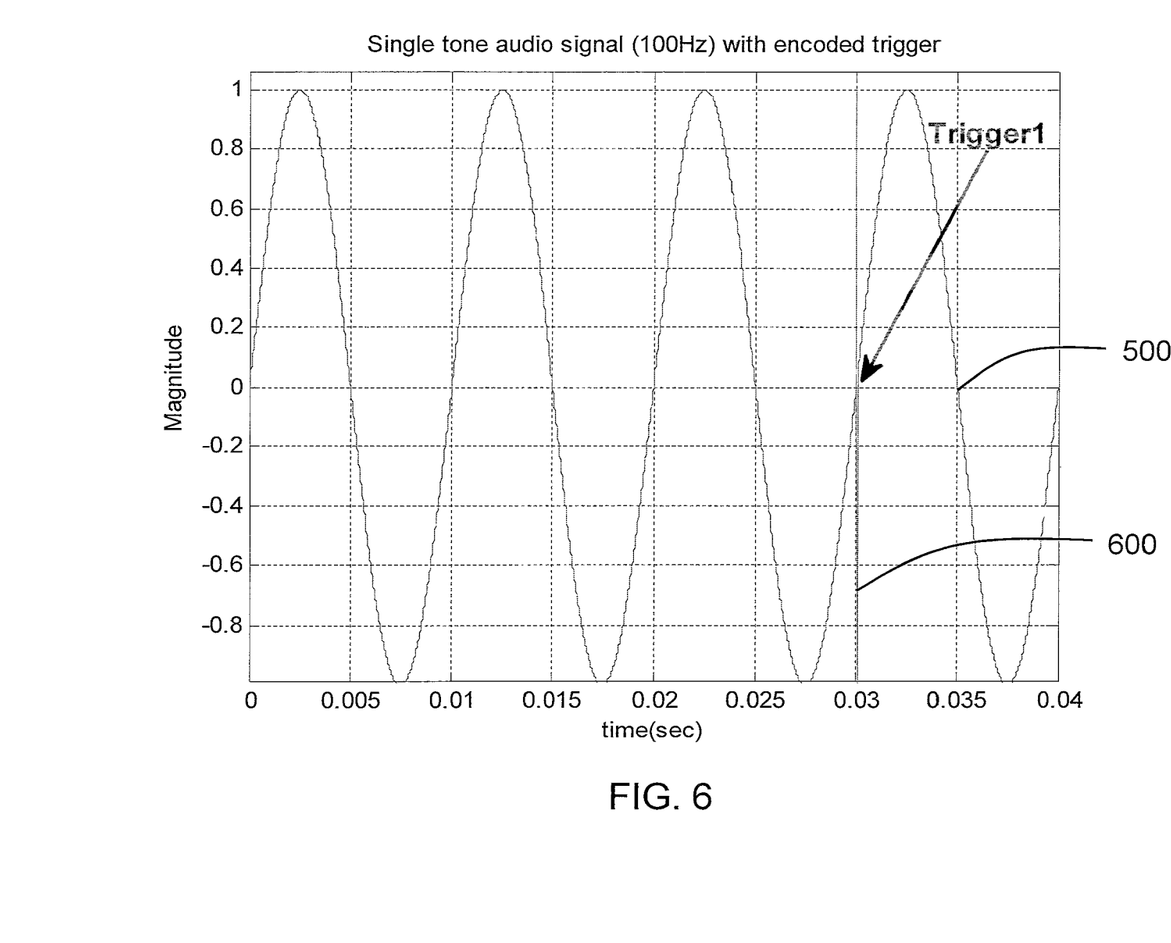
FIG. 6 illustrates an encoded haptic effect trigger mark in the single tone audio signal of FIG. 5.

FIG. 5 illustrates a single tone audio signal (at 100 Hz), represented by 500, to which a haptic effect trigger mark will be added during the fourth cycle. FIG. 6 illustrates an encoded haptic effect trigger mark 600 in the single tone audio stream 500 of FIG. 5, which is located at a time of 0.03 sec. Assuming the audio stream 500 is represented by s(t), and the trigger mark or signal 600 by Tr(t), then $$Tr(t) = \sin(2\pi f_{enc} t), \text{ where } t \in \left[0, \frac{n}{f_{enc}}\right]$$ (1)

In Equation (1), $f_{enc}$ is the high frequency signal that for a sampling frequency $f_s$ of the audio stream, $f_{enc}=f_s/2$, or alternatively $f_{enc}=f_s/4$. The n value in Equation (1) is an integer number that determines the number of oscillations the encoded signal would have. The resulting encoded signal is obtained by adding Tr(t) to s(t) at a specific location where the trigger is desired.

$$s_{enc}(t) = s(t) + Tr(t), \text{ where } t \in \left[t_{init}, t_{init} + \frac{n}{f_{enc}}\right]$$ (2)

In Equation (2), $t_{init}$ is the starting location where the trigger is desired. The encoding of the trigger using $f_{enc}=f_s/4$, n=1 at the fourth oscillation (at 0.03 sec) results in the graphs illustrated in FIGS. 7A-8.

Figure 7A:
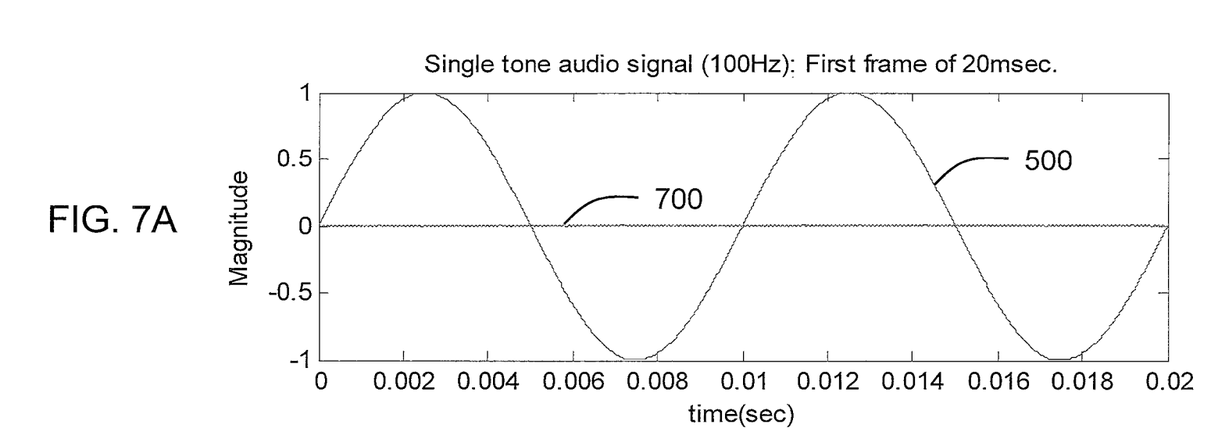
FIG. 7A illustrates an embodiment of a 20 msec frame of the single tone audio signal of FIG. 6 that does not include encoded haptic information.
Figure 7B:
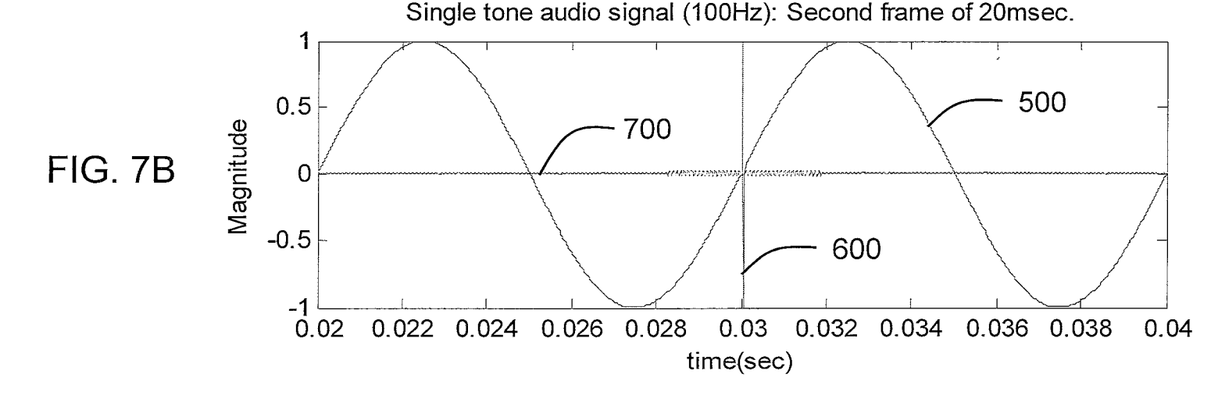
FIG. 7B illustrates an embodiment of another 20 msec frame of the single tone audio signal of FIG. 6 that includes the encoded haptic information.
Figure 8:
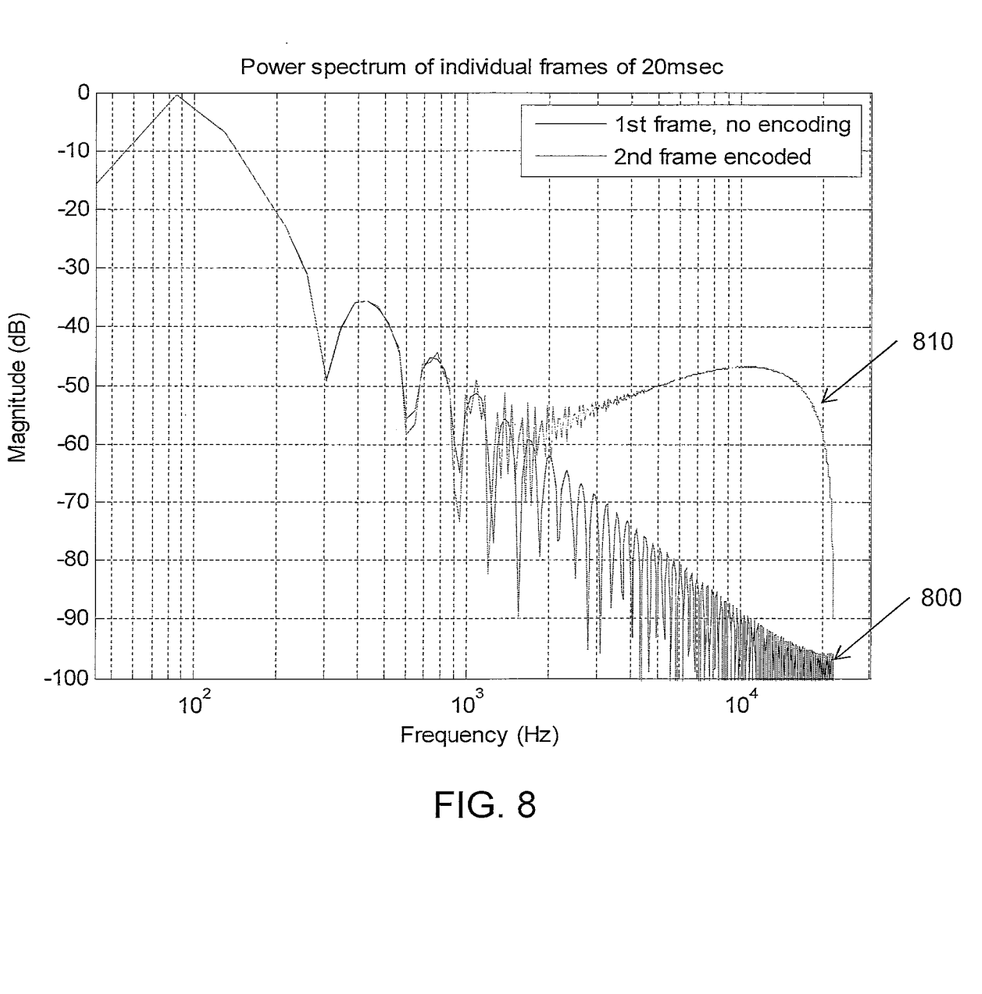
FIG. 8 illustrates an embodiment of a power spectrum of filtered signals of FIGS. 7A and 7B.

FIG. 7A illustrates an initial 20 msec frame of the single tone audio signal 500 that does not include encoded haptic information, and FIG. 7B illustrates a second 20 msec frame that includes the encoded haptic information 600. The original audio signal is represented by 500, and a filtered signal when using a bandpass filter at $f_{enc}$ is represented by 700. FIG. 8 illustrates the power spectrum of the filtered signals of FIGS. 7A and 7B. Plot 800 corresponds to the filtered audio signal 700 in the first frame of FIG. 7A, and plot 810 corresponds to the filtered audio signal with the encoded $f_{enc}$ signal in the second frame of FIG. 7B.

Figure 9:
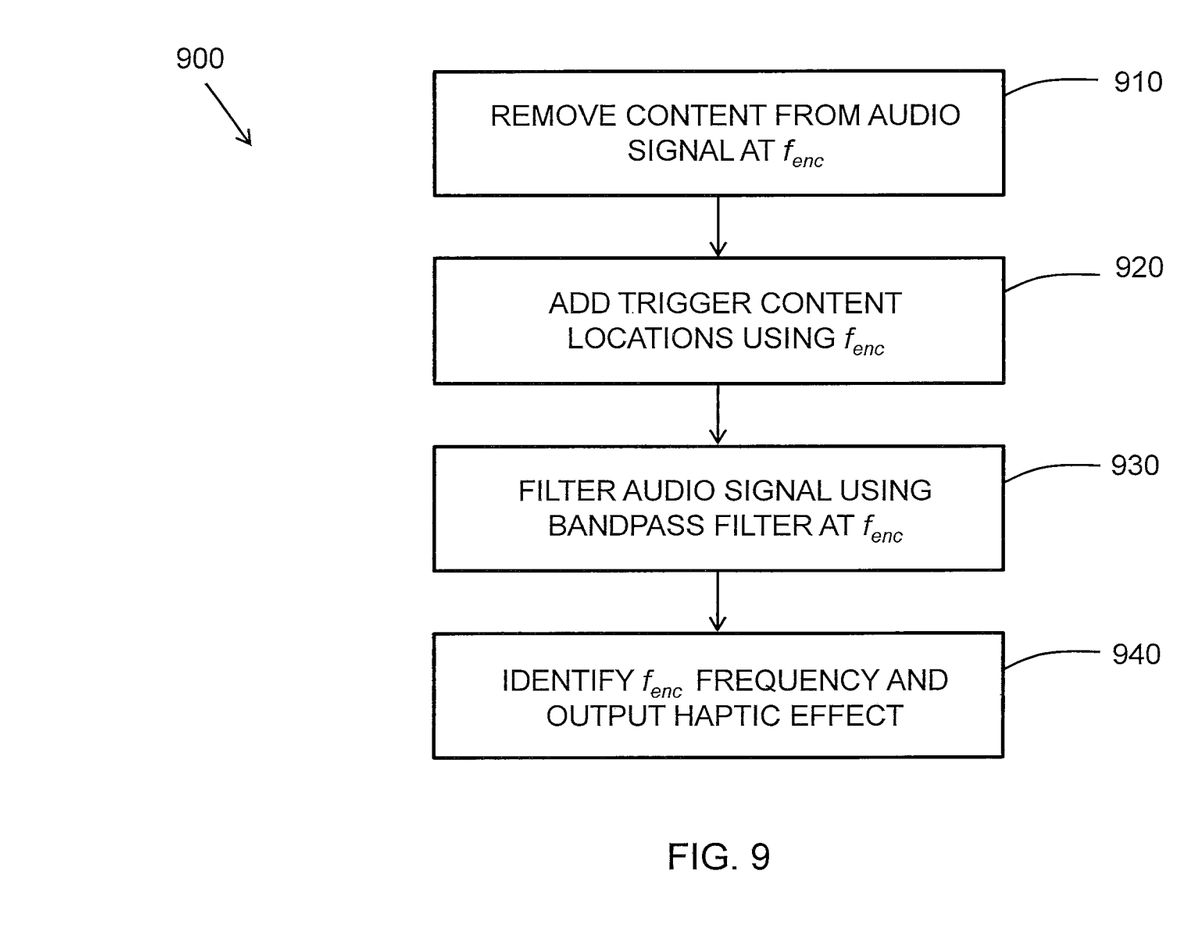
FIG. 9 illustrates an embodiment of a method to encode the haptic trigger and to decode the haptic trigger during playback.

FIG. 9 illustrates an embodiment of a method 900 to encode the haptic trigger and to decode the haptic trigger during playback. At 910, content from the original audio signal is remove at $f_{enc}$. Removing the $f_{enc}$ content from the original audio signal may ensure the haptic information is encoded properly with no frequency shadowing native of the audio stream. The content may be removed using a stop band filter with a center frequency of $f_{enc}$. At 920, the haptic trigger marks may be added to content locations using $f_{enc}$. In order to decode the haptic information, an inverse methodology may be used. For example, at 930, each frame may be filtered using a bandpass filter at $f_{enc}$ and if the $f_{enc}$ frequency is found at 940, the haptic effect will be created, played, output, etc.

Other information that may be encoded includes magnitude and frequency of the effect, duration of the effect, type of effect, and the number of effects, when effects are stored a library, such as the electronic storage 119 discussed above. The method disclosed herein may be completed using more than one frequency to encode the information, and more than one set of filters to encode/decode the data. Using more than one oscillation will make the signal stronger at the encoding time, but may result in audible distortions. If the audio can be processed in real time, the encoded haptic information may be removed from the audio stream previous to the audio stream being sent to the speaker 190, so that no audible distortions will be detected by the listener.

According to embodiments of the invention, a speaker that is separate from the electronic device 100 may transmit haptic information laid over an audio signal to a haptic device equipped with an audio receiver, such as a microphone, within the vicinity of the speaker and generate a haptic effect. By using the audio signal to carry the haptic output signal and a speaker to communicate the haptic information to the haptic device via a receiver, the need for data network connectivity (e.g. WiFi, Bluetooth, Cellular network, etc.) for transmitting signals carrying haptics information to portable devices may be eliminated.

Figure 10:
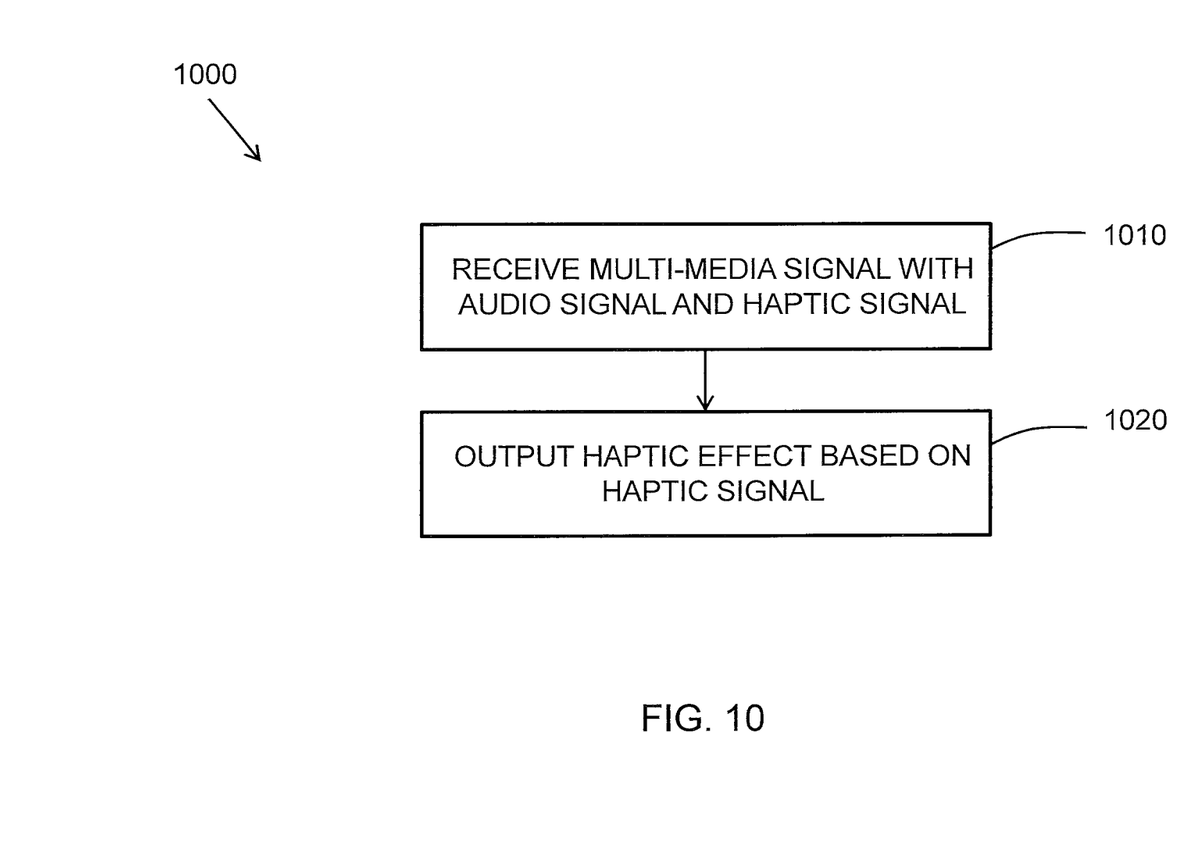
FIG. 10 illustrates an embodiment of a method for generating a haptic effect based on haptic information received in a multi-media signal.

In an embodiment, the haptic information in the form of a haptic signal may be communicated to a haptic device by using the high-frequency inaudible range between a speaker and a receiver (e.g. microphone), using a method 1000, for example, illustrated in FIG. 10. At 1010, a multi-media signal that includes an audio signal and a haptic signal are received with a receiver of a haptic device. The receiver may be a microphone located on the haptic device. The haptic signal may have a higher frequency than the audio signal. At 1020, a haptic effect based on the haptic signal in the multi-media signal is output by the haptic output device of the haptic device.

The haptic device may be any electronic device that the listener is in contact with while listening to the audio signal, such as a smartphone, or a wearable device that may be worn on a wrist, a hand, the head, around the neck, around the waist, etc. For example, the haptic device may be the electronic device 100 described above that includes the haptic output device 160 and the audio receiver 180. In an embodiment, the haptic device may be part of a piece of furniture that the listener is in contact with while listening to the audio signal, such as a chair, a sofa, etc.

In an embodiment, speakers in a sports stadium may broadcast relevant haptic signals as certain events such as scoring a goal, running pace of an athlete, etc., take place. Haptic effects corresponding to the events may be generated on the spectators' smart phones, wearable devices, seats, etc., thereby making the experience of watching the game more immersive. In an embodiment, the spectators may choose to receive haptic cues dedicated/designed for the events related to one of the teams, a certain athlete, or an object/equipment in the field, such as a net in tennis, a goalpost or crossbar in soccer, etc. In an embodiment, haptics cues, designed for certain scenes of the movie playing in a movie theater may be included on the sound track and trigger haptic effects on the handsets or seats of the audience. In an embodiment, silent haptic effects, corresponding to the music played by the whole orchestra, or a single musician, during a concert may be delivered to the audience member's handsets, wearable devices, or seats to enhance/augment the experience. In an embodiment, during a presentation, the presenter's laptop may send haptic alerts to grab the attention of the audience when an important part of the presentation is being discussed. In an embodiment, haptic effects of various types may be transmitted to the people in vicinity of a certain store in a shopping mall. In an embodiment, a person watching television or listening to a radio may receive haptic effects through a handheld electronic device, such as a smartphone, a wearable device, or furniture the person is contacting.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A computer-implemented method for encoding haptic information inside a multi-media file having content, to be performed on a processor, the method comprising:
removing, by the processor, a portion of the content in the multi-media file; and
adding, by the processor, the haptic information to the multi-media file in place of the portion of the content, the haptic information corresponding to a haptic signal for generating a haptic effect upon playback of the multi-media file,
wherein the haptic information includes a haptic trigger mark having a time duration of less than one millisecond.

2. The method according to claim 1, wherein the content of the multi-media file includes an image.

3. The method according to claim 1, wherein the content of the multi-media file includes video content.

4. The method according to claim 1, wherein the content of the multi-media file includes audio content.

5. The method according to claim 1, wherein removing the portion of the content from the multi-media file includes filtering frequency content within the multi-media file with a filter.

6. The method according to claim 5, wherein the filter is a stop band filter having a center frequency corresponding to a frequency of the haptic information being added in place of the portion of the content.

7. A computer-implemented method for encoding haptic information inside a multi-media file having content, to be performed on a processor, the method comprising:
receiving, by the processor, the multi-media file; and
adding a haptic trigger mark having a time duration of less than one millisecond to the multi-media file,
wherein the content includes at least audio content, and the haptic trigger mark corresponds to a predetermined haptic effect to be played back at the time of the haptic trigger mark in the multi-media file.

8. The computer-implemented method of claim 7, wherein the haptic trigger mark is added to the audio content of the multi-media file.

9. The computer-implemented method of claim 8, further comprising removing a portion of the audio content of the multi-media file at an encoding frequency of the haptic trigger mark.

10. The computer-implemented method of claim 7, further comprising:
accessing, by the processor, an effects library storing the predetermined haptic effect; and selecting, by the processor, the predetermined haptic effect from the effects library based on the haptic trigger mark.

11. A computer-implemented method for encoding haptic information inside a multi-media file having content, to be performed on a processor, the method comprising:
removing, by the processor, a portion of the content in the multi-media file; and
adding, by the processor, the haptic information to the multi-media file in place of the portion of the content, the haptic information corresponding to a haptic signal for generating a haptic effect upon playback of the multi-media file
wherein the haptic information includes a haptic trigger mark including a signal at an encoding frequency, the signal including one oscillation at the encoding frequency.

12. The method according to claim 11, wherein the content of the multi-media file includes an image.

13. The method according to claim 11, wherein the content of the multi-media file includes video content.

14. The method according to claim 11, wherein the content of the multi-media file includes audio content.

15. The method according to claim 11, wherein removing the portion of the content from the multi-media file includes filtering frequency content within the multi-media file with a filter.

16. The method according to claim 15, wherein the filter is a stop band filter having a center frequency corresponding to a frequency of the haptic information being added in place of the portion of the content.

17. A computer-implemented method for encoding haptic information inside a multi-media file having content, to be performed on a processor, the method comprising:
receiving, by the processor, the multi-media file; and
adding a haptic trigger mark including a signal at an encoding frequency, the signal including one oscillation at the encoding frequency to the multi-media file,
wherein the content includes at least audio content, and the haptic trigger mark corresponds to a predetermined haptic effect to be played back at the time of the haptic trigger mark in the multi-media file.

18. The computer-implemented method of claim 17, wherein the haptic trigger mark is added to the audio content of the multi-media file.

19. The computer-implemented method of claim 18, further comprising removing a portion of the audio content of the multi-media file at an encoding frequency of the haptic trigger mark.

20. The computer-implemented method of claim 17, further comprising:
accessing, by the processor, an effects library storing the predetermined haptic effect; and selecting, by the processor, the predetermined haptic effect from the effects library based on the haptic trigger mark.

* * * * *